United States Patent
Lamm et al.

(10) Patent No.: US 6,759,153 B1
(45) Date of Patent: Jul. 6, 2004

(54) LIQUID FUEL CELL SYSTEM

(75) Inventors: Arnold Lamm, Elchingen (DE); Jens Müller, Blaustein (DE); Norbert Wiesheu, Günzburg (DE)

(73) Assignees: Ballard Power Systems AG, Kirchheim-Nabern (DE); Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/623,011

(22) PCT Filed: Feb. 23, 1999

(86) PCT No.: PCT/EP99/01144

§ 371 (c)(1),
(2), (4) Date: Sep. 28, 2000

(87) PCT Pub. No.: WO99/44250

PCT Pub. Date: Sep. 2, 1999

(30) Foreign Application Priority Data

Feb. 25, 1998 (DE) .......................... 198 07 876

(51) Int. Cl.[7] .......................... H01M 8/00; H01M 8/04; H01M 8/12; H01M 2/00; H01M 2/02
(52) U.S. Cl. .......................... 429/13; 429/25; 429/26; 429/34
(58) Field of Search .......................... 429/26, 22, 34, 429/12, 13, 25

(56) References Cited

U.S. PATENT DOCUMENTS 5,503,944 A * 4/1996 Meyer et al. ............. 429/13
5,573,866 A 11/1996 Van Dine et al. .......... 429/13
5,599,638 A 2/1997 Surampudi et al. ........ 429/33

FOREIGN PATENT DOCUMENTS

| EP | 0 859 421 A1 | 8/1998 |
| EP | WO 98/5477 | 12/1998 |
| JP | 56 097972 | 8/1981 |
| JP | 56 118275 | 9/1981 |
| JP | 57 196479 | 12/1982 |
| JP | 63 066860 | 3/1988 |
| JP | 04 229958 | 8/1992 |

* cited by examiner

Primary Examiner—Patrick Ryan
Assistant Examiner—Julian Mercado
(74) Attorney, Agent, or Firm—Seed IP Law Group PLLC

(57) ABSTRACT

Fuel cell system comprising at least one fuel cell which includes an anode compartment and a cathode compartment which are separated from one another by a proton-conducting membrane, further comprising a cathode feeder for delivering oxygen-containing gas to the cathode compartment, an anode feeder for delivering a liquid coolant/fuel mixture to the anode compartment, the anode compartment being disposed in an anode circuit which comprises a gas separator and a pump, and cooling of the coolant/fuel mixture circulating in the anode circuit is effected by the fuel cell which is designed for operation involving water break-through from the anode compartment into the cathode compartment. The evaporation cooling thus achieved in the fuel cell results in cooling of the coolant/fuel mixture at a steady-state operating temperature which is established in the fuel cell as a function of the membrane properties and the speed of the pump, thus obviating the need for any additional cooler in the anode circuit itself.

11 Claims, 1 Drawing Sheet

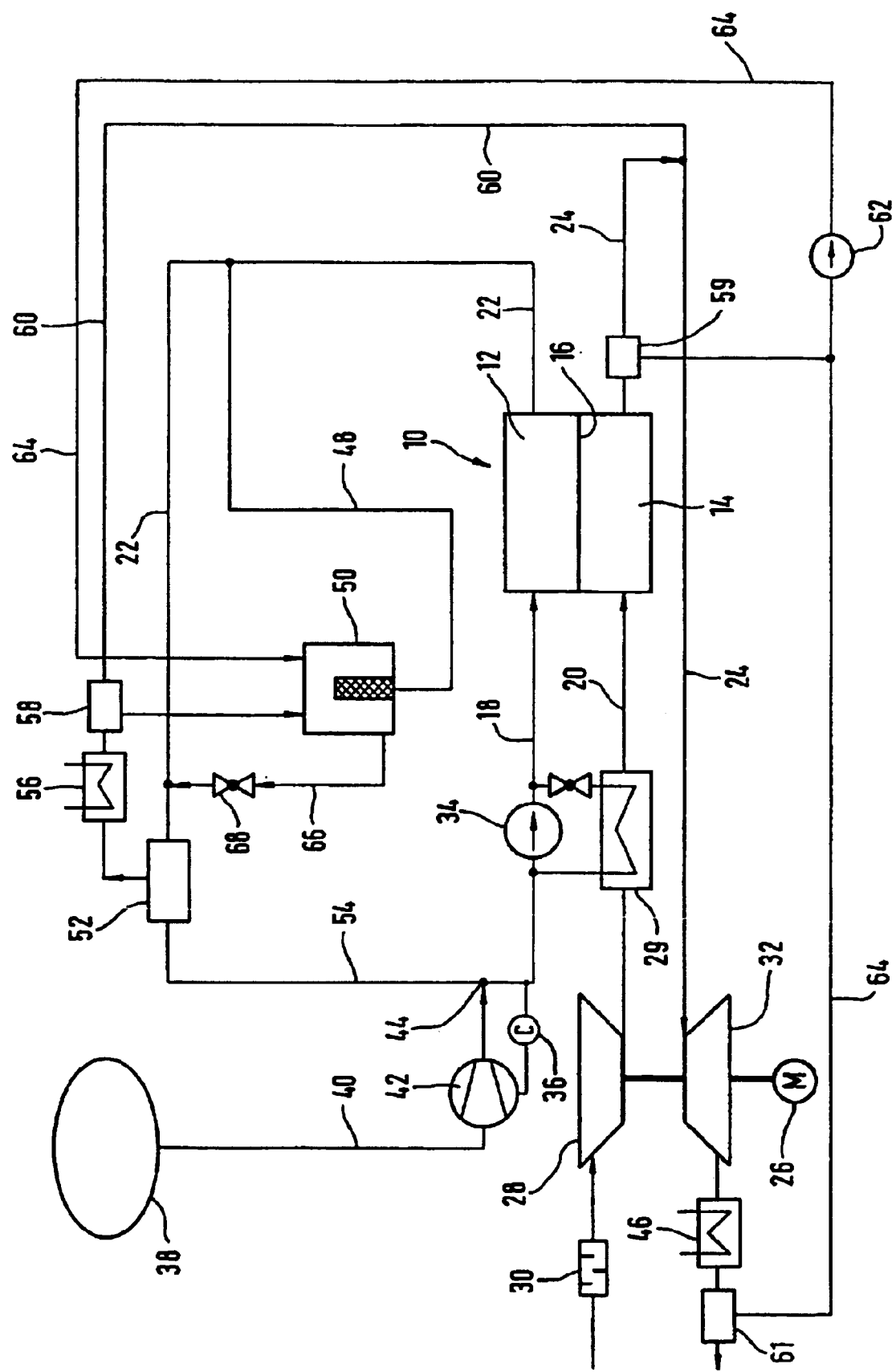

LIQUID FUEL CELL SYSTEM

BACKGROUND AND SUMMARY OF THE INVENTION

The invention relates to a fuel cell system comprising a fuel cell which includes an anode compartment and a cathode compartment which are separated from one another by a proton-conducting membrane.

At present, the method most widely envisaged for converting liquid energy sources into electrical energy in a fuel cell system comprising a proton exchange membrane (PEM fuel cell) all over the world is that of reforming methanol in a gas generation system. This involves a water/methanol mixture being evaporated and being converted, in a reformer, into hydrogen, carbon dioxide and carbon monoxide. Evaporation and reforming are very expensive in terms of the energy balance. This entails reduced efficiencies for the system as a whole. Moreover, gas beneficiation steps are required to clean the reforming gas. The cleaned gas is delivered to the PEM fuel cell system. Additionally, a cooler must be provided to cool the coolant/fuel mixture circulating in the anode circuit.

A further problem is that of the water used in the reforming process. The product water produced on the cathode side does not suffice to cover the water needed. Consequently, a separate water tank is required.

A so-called direct-methanol fuel cell system, as disclosed by U.S. Pat. No. 5,599,638, makes use of an aqueous methanol solution which reacts on the anode side to form carbon dioxide. The fuel cell system described there includes a so-called stack consisting of a plurality of interconnected fuel cells. The anode compartment of the stack forms part of an anode circuit, comprising a heat exchanger to cool the coolant/fuel mixture which is ducted off from the anode outlet and contains carbon dioxide, a circulation tank in which the cooled mixture is added to a freshly supplied coolant/fuel mixture, a gas separator which is integrated within the circulation tank and has the purpose of separating carbon dioxide, and a pump to feed the coolant/fuel mixture from the circulation tank into the anode compartment via a corresponding feeder. The oxygen- and water vapour-comprising cathode off-gas of the known fuel cell system is passed through a water separator, the separated water being fed to the coolant/fuel mixture which is to be delivered to the anode circuit, and part of the remaining oxygen being passed to the oxidant supply for the cathode compartment.

Based on this, it is an object of the invention to provide a simpler-design, compact fuel cell system comprising a proton-conducting membrane and having an improved overall efficiency.

In a preferred embodiment, the fuel cell system involves passing water through the anode compartment into the cathode compartment, evaporation cooling is effected in the fuel cell as the water is absorbed by the hot air of the cathode compartment, said evaporation cooling being utilized according to the invention to cool the anode circuit. Owing to this measure, the cooler which otherwise has to to be provided in the anode circuit can be dispensed with.

In a preferred method, the fuel cell is operated in heat balance equilibrium, i.e. the fuel cell is operated in a steady state at a temperature which, on the one hand, depends on the properties of the proton-conducting membrane and, on the other hand, can be adjusted via the speed of the liquid pump. Depending on the duty point, the temperature of the steady state operation is between 90 and 110° C. Setting a steady-state operating temperature is of crucial importance in increasing the efficiency of the fuel cell or of the stack formed from a plurality of fuel cells, since this will enable isothermal operation of the stack, i.e. temperature differences over the length of the stack of an order of magnitude of about 10° C., which are standard in known systems, will no longer occur, or only to an insignificant extent.

The inventive evaporation cooling in the fuel cell has the additional advantage that the mass flow of the dry air is increased by a factor of 1.5 to 2, entailing an increase in expander capacity by the same factor. This also entails energy savings for air supply in full-load operation.

In a preferred embodiment, an air cooler downstream of the expander is provided which is thermally coupled to the vehicle radiator and which serves for condensing out water to achieve a positive water balance in the system.

The invention is depicted schematically in the drawing with reference to a specific embodiment and is explained below in more detail with reference to the drawing.

BRIEF DESCRIPTION OF THE DRAWINGS

The only FIGURE shows a schematic depiction of the basic configuration of a fuel cell system according to the invention.

DETAILED DESCRIPTION OF THE INVENTION

The fuel cell system depicted in the FIGURE comprises a fuel cell 10 which consists of an anode compartment 12 and a cathode compartment 14, which are separated from one another by a proton-conducting membrane 16. Via an anode feeder 18, the anode compartment 12 is supplied with a liquid coolant/fuel mixture. The fuel used in this context can be any electrochemically oxidizable substance having the general structural formula H—[—$CH_2O$—]$_n$—Y, where $1 \leq n \leq 5$ and Y=H or Y=$CH_3$. The fuel cell system of the specific example shown is operated with liquid methanol as a fuel and water as a coolant. Even though the following is restricted to a description of the use of a water/methanol mixture, the scope of the present application is not meant to be limited to this specific example. Potentially suitable coolants include, in particular, liquids or ionic or nonionic additives to water which have good antifreeze properties. Possible fuels include, for example, branched variations on the abovementioned general formula, for example di- or trimethoxymethane.

An oxygen-containing gas is passed into the cathode compartment 14 via a cathode feeder 20. According to the specific example shown, ambient air is used for this purpose. In the fuel cell 10, the fuel is oxidized at the anode and the oxygen from the air is reduced at the cathode. For this purpose, the proton-conducting membrane 16 is coated with suitable catalysts on the appropriate surfaces. Protons are now able to migrate from the anode side through the proton-conducting membrane 16 and combine, at the cathode side, with the oxygen ions to form water. This electrochemical reaction gives rise to a voltage between the two electrodes. By connecting many such cells in parallel or in series to form a so-called stack, it is possible to achieve voltages and current intensities which are sufficiently high to drive a vehicle.

Formed as a product at the anode outlet is a carbon dioxide gas enriched with water and methanol. This liquid/gas mixture is discharged from the anode compartment 12 by an anode offtake 22. The cathode exhaust air containing residual oxygen and water vapour is ducted off via a cathode off-gas line 24. To achieve good efficiency, the ambient air is provided at positive pressure in the cathode compartment 14. For this purpose, there is disposed in the cathode feeder 20 a compressor 28 driven by an electric motor 26 and with a supercharger intercooler 29 downstream thereof, which compressor draws in the desired air mass flow and compresses it to the required pressure level. In the case of operation based on ambient air, an air filter 30 is preferably additionally provided in the inlet area of the cathode feeder 20 upstream of the compressor 28. Part of the energy required to compress the ambient air can be recovered with the aid of an expander 32 disposed in the cathode off-gas line 24. Preferably, the compressor 28, the expander 32 and the electric motor 26 are disposed on a common shaft. Control of the fuel cell output is achieved by open- or closed-loop control of the compressor speed and consequently of the available air mass flow.

On the anode side, the water/methanol mixture is circulated at a predefined pressure with the aid of a pump 34, so that an excess supply of fuel will be ensured at the anode at all times. The ratio of water to methanol in the anode feeder 18 is set with the aid of a sensor 36 which measures the methanol concentration in the anode feeder 18. Depending on this sensor signal, the concentration of the water/methanol mixture is then controlled, the liquid methanol being delivered from a methanol tank 38 via a methanol delivery line 40 and being injected into the anode feeder 18 with the aid of an injection nozzle 44 not shown in any detail. The injection pressure is generated by an injection pump 42 disposed in the methanol delivery line 40. The anode compartment 12 is therefore supplied at all times with a water/methanol mixture having a constant methanol concentration.

Then the carbon dioxide enriched with methanol vapour and water vapour must be separated from the liquid/gas mixture ducted off via the anode offtake 22. To this end, the liquid/gas mixture is delivered, via the anode offtake 22, to a gas separator 52 in which the carbon dioxide is separated off. The water/methanol mixture remaining in the gas separator 52 is recycled into the anode feeder 18 via a line 54.

The humid carbon dioxide gas separated off in the gas separator 52 is cooled to as low a temperature as possible in a cooler 56, further methanol and water being condensed out in a downstream water separator 58. The remaining dry carbon dioxide with a small residual level of methanol is passed, via a line 60, to the cathode gas offtake 24, where it is mixed with the oxygen-rich cathode exhaust air.

To separate as much liquid water as possible from the cathode exhaust air, a first water separator 59 is provided downstream of the outlet of the cathode compartment 14, and a further water separator 61 is provided downstream of the expander 32, as much as possible of the water vapour formed on the cathode side being delivered to the expander 32. In this arrangement, the expander 32 serves as a compact condensing turbine at whose outlet part of the water vapour condenses out. The water collected in the water separators 59, 61 is then recycled, via a feedback line 64 with an integrated feedback pump 62, into a holding and purification tank 50 of a subsidiary branch 48, 66 of the anode circuit. In particular, the holding and purification tank 50 is an ion exchanger.

Provided in the anode circuit, downstream of the anode outlet in the anode offtake 22, is a branch line 48 which runs to the holding and purification tank 50. The outlet of the holding and purification tank 50 is again connected to the anode offtake 22, via a line 66 with an integrated valve 68, upstream of the gas separator 52. The holding and purification tank 50 serves to hold and to purify the water/methanol mixture from the anode compartment 12, the water separated in the water separator 58, and the product water produced on the cathode side and recycled into the anode circuit via the feedback line 64. The valve 68 firstly serves to prevent reverse flow from the anode offtake 22 into the line 66, and secondly to establish that fraction of the mixture from the anode offtake 22 which is to be passed through the holding and purification tank.

According to the invention, the fuel cell 10 is operated with water passing through the membrane 16 from the anode compartment 12 into the cathode compartment 14. The liquid water thus reaching the cathode compartment 14 is partially absorbed as vapour, up to saturation limit, by the dry, hot air entering the cathode compartment 14 via the cathode feeder 20. This results in evaporation cooling in the fuel cell 10, said evaporation cooling being utilized according to the invention to cool the coolant/fuel mixture circulating in the anode circuit. Thus the cooler which is otherwise normally provided in the anode offtake 22 can be dispensed with.

The water passthrough is due to an electro-osmotic transport phenomenon of the membrane 16. On the anode side, water molecules cluster around each proton. Electro-osmotic pressure causes the latter to migrate through the ion channels of the membrane 16, e.g. Nafion®, to the cathode side. The number of the bound water molecules in this situation is slightly temperature-dependent and also depends on the ion channel diameter of the membrane 16. The higher the electro-osmotic transport coefficient of the membrane 16, the more water will reach the cathode side, be able to evaporate there, and therefore, be able to be utilized for evaporation cooling of the fuel cell 10.

The transport via the membrane 16 causes about ten times more water to pass into the cathode compartment 14 than is formed there by the oxidation of hydrogen. In the case of e.g. a Nafion membrane, about 5 water molecules are bound to a proton which migrates through the membrane 16, whereas only one water molecule per two protons is formed in the oxidation. At 80° C., on average slightly fewer than 5, and at 120° C. slightly more than 5 water molecules are bound to a proton. In the case of a membrane material having larger ion channels, more water molecules can be bound to a proton, fewer in the case of a membrane material having smaller ion channels.

The water passing through the membrane 16 evaporates on the cathode side and cools the fuel cell 10 by evaporation cooling.

Preferably, the temperature of the cathode 14 is close to the boiling point of water, to evaporate as much of the permeating water as possible, the positive pressure prevailing at the cathode 14 being capable of being set in a simple manner to control the boiling point of water. At a positive pressure of 1 bar, the boiling point is about 120° C. instead of 100° C. at atmospheric pressure. The temperature of the fuel cell is established in accordance with the positive pressure applied at the cathode side.

The water vapour is delivered to the expander 32. It is particularly advantageous to prevent water vapour from condensing out en route to the expander 32. Thus, it is preferable that the lines are thermally insulated in a suitable manner, to prevent the water vapour from condensing out. Equally, it is expedient to make allowances, regarding the connection lines between cathode 16 and expander 32, for the larger volume required for the water vapour by making the line diameters sufficiently large.

In the fuel cell 10, owing to the operation in water-passthrough mode, a steady-state operating temperature can be set without the need of the cooler normally provided in the anode circuit. The steady-state operating temperature can be set by controlling the positive pressure in the cathode compartment 14 and/or the speed of the pump 34 which provides the volume flow on the anode side. Advantageously, the steady-state operating temperature is between 90 and 110° C., particularly 105° C. This allows the fuel cell or a stack formed of a plurality of fuel cells to be operated virtually isothermally.

Evaporation cooling additionally, as already mentioned above, has the advantage of increasing the mass flow of the dry air by a factor of from 1.5 to 2. Thus the capacity of the expander 32 is increased by the same factor, entailing energy savings for the air supply. These savings are about 8 kW in full-load operation. An air cooler 46 disposed downstream of the expander 32 is thermally coupled to the vehicle radiator (not shown in any detail) and has the purpose of condensing out water from the exhaust air stream to achieve a positive water balance in the system.

What is claimed is:

1. A fuel cell system, comprising:
   1) at least one fuel cell which has
      a) an anode compartment,
      b) a cathode compartment, and
      c) a proton-conducting membrane which separates said anode compartment from said cathode compartment and is capable of allowing water to pass;
   2) a cathode circuit in which said cathode compartment is disposed, said cathode circuit further including a cathode feeder for delivering oxygen-containing gas to said cathode department;
   3) an expander unit disposed in said cathode circuit, wherein water vapor generated in the cathode compartment is delivered to said expander unit;
   4) an anode circuit in which said anode compartment is disposed, said anode circuit further including an anode offtake connected to a gas separator, and an anode feeder for delivering a liquid coolant/fuel mixture to said anode compartment, whereby cooling in the anode circuit is effected by evaporation of liquid coolant that passes through said membrane from the anode compartment into the cathode compartment, with no additional heat exchanger being provided in said anode circuit; and
   5) means for setting and maintaining a desired operating temperature in said fuel cell by adjusting at least one of pressure in said cathode compartment or a rate of delivery of the liquid coolant/fuel mixture to said anode compartment.

2. The fuel cell system of claim 1, further comprising a compressor unit disposed in said cathode feeder.

3. The fuel cell system of claim 1, further comprising a compressor unit disposed in said cathode feeder.

4. The fuel cell system of claim 3, further comprising a supercharger intercooler, a cooler, and at least one water separator for water recovery, wherein said supercharger intercooler is disposed downstream of the compressor unit, and said cooler and at least one water separator are disposed downstream of the expander unit.

5. The fuel cell system of claim 4, further comprising a feedback line, wherein recycling of recovered water from the at least one water separator into the anode circuit is provided via said feedback line.

6. The fuel cell system of claim 1, further comprising a holding and purification tank disposed in said anode circuit.

7. The fuel cell system of claim 6, further comprising a subsidiary branch of the anode offtake, wherein said holding and purification tank is disposed in said subsidiary branch upstream of said gas separator.

8. The fuel cell system according to claim 1, further comprising:
   5) a subsidiary branch of the anode offtake, which splits off from said anode offtake, and is connected to said gas separator; and
   6) a holding and purification tank disposed in said subsidiary branch, upstream of said gas separator.

9. A method of operating a fuel cell system having at least one fuel cell which includes an anode compartment and a cathode compartment which are separated from one another by a proton-conducting membrane, and an anode feeder for delivering a liquid coolant/fuel mixture to the anode compartment, comprising:

passing coolant through the proton-conducting membrane from the anode compartment into the cathode compartment;

evaporating the coolant in the anode compartment; and adjusting temperature in said at least one fuel cell to a desired value by varying a rate at which said coolant evaporates in said cathode compartment;

wherein said varying of said rate at which coolant evaporates in said cathode compartment is performed by adjusting at least one of a flow rate of the liquid coolant/fuel mixture or pressure in said cathode compartment.

10. The method of claim 9, wherein the operating temperature is between 90 and 110° C.

11. A method of controlling an operating temperature of a fuel cell system having at least one fuel cell that includes an anode compartment and a cathode compartment which are separated from one another by a proton-conducting membrane, and an anode feeder for delivering a liquid coolant/fuel mixture to the anode compartment, comprising:

passing coolant through the proton-conducting membrane from the anode compartment into the cathode compartment;

evaporating the coolant passing into the cathode compartment, whereby the evaporation of the coolant cools the coolant/fuel mixture in the anode compartment; and setting and maintaining a desired operating temperature in said fuel cell system by varying a rate at which said coolant evaporates in said cathode compartment;

wherein said varying of said rate at which coolant evaporates in said cathode compartment is performed by adjusting at least one of a flow rate of the liquid coolant/fuel mixture or pressure in said cathode compartment.

* * * * *